United States Patent
Ishida et al.

(10) Patent No.: US 7,028,321 B2
(45) Date of Patent: Apr. 11, 2006

(54) MEDIA CARTRIDGE HAVING A SMALL-SIZED STORAGE MEDIUM ATTACHMENT UNIT

(75) Inventors: Yoichi Ishida, Tokyo (JP); Shunsuke Tsubota, Tokyo (JP); Makoto Nemoto, Tokyo (JP)

(73) Assignee: NEC Corporation, Tokyo (JP)

( * ) Notice: Subject to any disclaimer, the term of this patent is extended or adjusted under 35 U.S.C. 154(b) by 25 days.

(21) Appl. No.: 10/777,202

(22) Filed: Feb. 13, 2004

(65) Prior Publication Data

US 2004/0163098 A1 Aug. 19, 2004

Related U.S. Application Data

(62) Division of application No. 09/736,368, filed on Dec. 15, 2000, now Pat. No. 6,754,142.

(30) Foreign Application Priority Data

Dec. 17, 1999 (JP) ................... 11-358853

(51) Int. Cl.
G11B 15/06 (2006.01)
G06K 7/00 (2006.01)

(52) U.S. Cl. ...................... 720/720; 235/486

(58) Field of Classification Search ........... 720/720, 720/728, 745; 369/75.1, 75.2, 77.1, 37, 30.99, 369/34.01, 36.01, 38.01, 39.01, 41.01, 289

See application file for complete search history.

(56) References Cited

U.S. PATENT DOCUMENTS

| | | | |
|---|---|---|---|
| 2,316,815 A | | 4/1943 | Sears |
| 4,872,151 A | | 10/1989 | Smith |
| 5,003,530 A | * | 3/1991 | Yamamori .................. 720/720 |
| 5,563,400 A | | 10/1996 | Le Roux |
| 5,584,043 A | | 12/1996 | Burkart |
| 5,646,920 A | | 7/1997 | Raczynski |
| 5,663,553 A | | 9/1997 | Aucsmith |
| 5,870,364 A | | 2/1999 | Raczynski |
| 6,047,341 A | | 4/2000 | Niwata et al. |
| 6,754,142 B1 | * | 6/2004 | Ishida et al. ............. 369/37.01 |

FOREIGN PATENT DOCUMENTS

| | | |
|---|---|---|
| DE | 196 01 176 A | 7/1997 |
| JP | 6-509194 | 10/1994 |
| JP | 8-504523 | 5/1996 |
| JP | 10-92079 | 4/1998 |
| JP | 0 911 824 | 4/1999 |
| JP | 3060055 | 4/1999 |
| JP | 11-126244 | 5/1999 |
| WO | WO 95/22096 | 8/1995 |
| WO | WO 98/11497 | 3/1998 |

* cited by examiner

*Primary Examiner*—George J. Letscher
*Assistant Examiner*—Christopher R. Magee
(74) *Attorney, Agent, or Firm*—Foley & Lardner LLP

(57) ABSTRACT

A disk drive system having a disk-shaped disk storage medium and a disk drive for accessing the disk storage medium including a media cartridge of the same shape as that of the disk storage medium to which not less than one small-sized storage medium is attachable, and an access unit provided in the disk drive for accessing the small-sized storage medium attached to the media cartridge.

20 Claims, 7 Drawing Sheets

MEDIA CARTRIDGE HAVING A SMALL-SIZED STORAGE MEDIUM ATTACHMENT UNIT

CROSS-REFERENCE TO RELATED PATENT APPLICATIONS

This application is a division of application Ser. No. 09/736,368, filed Dec. 15, 2000, now U.S. Pat. No. 6,754,142, and based on Japanese Patent Application No. 11-358853, filed Dec. 17, 1999, by Yoichi Ishida, Shunsuke Tsubota and Makoto Nemoto. This application claims only subject matter disclosed in the parent application and therefore presents no new matter.

BACKGROUND OF THE INVENTION

1. Field of the Invention

The present invention relates to a disk drive system for accessing a disc-shaped storage medium such as an optical disk and, more particularly, to a disk drive system enabling access not only to a disk-shaped storage medium but also to a small-sized storage medium such as smart media.

2. Description of the Related Art

In recent years, a wide variety of devices have been presented using so-called smart media (SSFDC: solid state floppy disk card) as recording media.

The smart media are light-weight (2 g) and thin small-sized (length: 45 mm, width: 37 mm, height: 0.76 mm) flash memory cards which have a simple structure and are easy to carry to allow the use as a removable storage medium for a portable information terminal such as a digital camera.

In addition, the smart media are suitable for helping making these applied products smaller and have excellent portability allowing themselves put between leaves of a pocket notebook or a pass-case to carry.

Data writing and reading of smart media is conducted by connecting an access device for smart media not only to a digital electronic still camera and a portable information terminal but also to a personal computer etc. or by means of an adapter through a slot of a PC card.

Connecting an access device for external attachment to a personal computer, however, needs a space for the device and a connection code, as well as costing labor for the connection. In addition, it has such a shortcoming as larger electric power consumption than that consumed for an internally provided device.

Moreover, internally providing an access device for smart media has such a drawback as that the size and cost of a main body of a personal computer are increased because an information apparatus such as a personal computer has a limited installation space for internally mounting a device. Also as to a slot for a PC card, since it is scarcely mounted on standard desk-top personal computers for the same reason, use of a PC card requires an access device for the PC card to be added.

Technique directed to solving these conventional problems is disclosed, for example, in Japanese Utility Model Registration No. 160055. Making use of the fact that in many desk-top personal computers, an FDD drive is installed using an installation space (bay) for a peripheral equipment provided at the front of the main body, the art recited in Japanese Utility Model Registration No. 160055 proposes a composite FDD device in which a drive for smart media is internally provided in an FDD drive and an insertion slot of a floppy disk and an insertion slot of smart media are provided together on the upper and lower sides.

As described in the foregoing, conventional techniques have the following problems.

Although a dedicated device for accessing smart media is conventionally installed by external attachment to a personal computer or provision within the same, the installation occupies a space for putting the personal computer or a free space within the main body of the personal computer because the dedicated device should be provided together with other disk drive devices. In a case where a dedicated device for accessing a smart media is installed later, it will be difficult to ensure an installation space in an information apparatus such as a personal computer in many cases.

On the other hand, according to the related art disclosed in the above-described Japanese Utility Model Registration No. 160055, although a drive for smart media is contained in an FDD drive, the FDD drive has a dedicated specification different from that of an ordinary FDD drive. Therefore, it is impossible to replace the FDD drive with an ordinary FDD drive and install the same with ease. Moreover, access is made by inserting smart media one by one to deteriorate efficiency.

SUMMARY OF THE INVENTION

An object of the present invention is to eliminate the above-described shortcomings of conventional techniques and to provide a disk drive system realizing reduction in a device installation space in an information apparatus such as a personal computer by allowing a space for a disk drive to make access to both optical disk media and smart media.

Another object of the present invention is to provide a disk drive system which realizes a smart media changer function through attachment of a plurality of smart media, thereby efficiently accessing a plurality of smart media.

According to one aspect of the invention, a disk drive system including a disk-shaped disk storage medium and a disk drive for accessing the disk storage medium, comprises
a media cartridge of the same shape as that of the disk storage medium to which not less than one small-sized storage medium is attachable, wherein
the disk drive includes
access means for accessing the small-sized storage medium mounted on the media cartridge.

In the preferred construction, in the media cartridge, a unit to be detected for the position detection of the small-sized storage medium is provided, and
on the disk drive side, position detection means for detecting the unit to be detected of the media cartridge is provided,
the unit to be detected being composed of
claws provided on a disk surface of the media cartridge so as to correspond to an attachment position of the small-sized storage medium, and
the position detection means being structured by
a micro-switch for sensing a contact by the claw.

In another preferred construction, the disk drive includes:
a disk rotation shaft for rotating the media cartridge and the disk storage medium at a predetermined rotation speed,
a disk storage medium access unit for executing access to the disk storage medium,
an access unit for executing access to the small-sized storage medium mounted on the media cartridge, and
identification means for identifying an attached media as the media cartridge or the disk storage medium.

In another preferred construction, in the media cartridge, a unit to be detected for the position detection of the small-sized storage medium is provided,
on the disk drive side, position detection means for detecting the unit to be detected of the media cartridge is provided,
the unit to be detected being composed of
claws provided on a disk surface of the media cartridge so as to correspond to an attachment position of the small-sized storage medium, and
the position detection means being structured by
a micro-switch for sensing a contact by the claw, and
the disk drive includes:
a disk rotation shaft for rotating the media cartridge and the disk storage medium at a predetermined rotation speed,
a disk storage medium access unit for executing access to the disk storage medium,
an access unit for executing access to the small-sized storage medium mounted on the media cartridge, and
identification means for identifying an attached media as the media cartridge or the disk storage medium.

In another preferred construction, the media cartridge includes a plurality of attachment units which are provided within a disk surface and on which the small-sized storage medium is to be mounted,
each the attachment unit being located at an equal position from the center of the media cartridge.

In another preferred construction, in the media cartridge, a unit to be detected for the position detection of the small-sized storage medium is provided,
on the disk drive side, position detection means for detecting the unit to be detected of the media cartridge is provided,
the unit to be detected being composed of
claws provided on a disk surface of the media cartridge so as to correspond to an attachment position of the small-sized storage medium,
the position detection means being structured by
a micro-switch for sensing a contact by the claw, and
the media cartridge includes
a plurality of attachment units which are provided within a disk surface and on which the small-sized storage medium is to be mounted,
each the attachment unit being located at an equal position from the center of the media cartridge.

In another preferred construction, the disk drive includes
a disk rotation shaft for rotating the media cartridge and the disk storage medium at a predetermined rotation speed,
a disk storage medium access unit for executing access to the disk storage medium,
an access unit for executing access to the small-sized storage medium mounted on the media cartridge, and
identification means for identifying an attached media as the media cartridge or the disk storage medium, and
the media cartridge includes
a plurality of attachment units which are provided within a disk surface and on which the small-sized storage medium is to be mounted,
each the attachment unit being located at an equal position from the center of the media cartridge.

In another preferred construction, in the media cartridge, a unit to be detected for the position detection of the small-sized storage medium is provided,
on the disk drive side, position detection means for detecting the unit to be detected of the media cartridge is provided,
the unit to be detected being composed of
claws provided on a disk surface of the media cartridge so as to correspond to an attachment position of the small-sized storage medium,
the position detection means being structured by
a micro-switch for sensing a contact by the claw,
the disk drive includes:
a disk rotation shaft for rotating the media cartridge and the disk storage medium at a predetermined rotation speed,
a disk storage medium access unit for executing access to the disk storage medium,
an access unit for executing access to the small-sized storage medium mounted on the media cartridge, and
identification means for identifying an attached media as the media cartridge or the disk storage medium, and
the media cartridge includes
a plurality of attachment units which are provided within a disk surface and on which the small-sized storage medium is to be mounted,
each the attachment unit being located at an equal position from the center of the media cartridge.

In another preferred construction, in the media cartridge, a unit to be detected for the position detection of the small-sized storage medium is provided,
on the disk drive side, position detection means for detecting the unit to be detected of the media cartridge is provided,
the media cartridge includes:
a plurality of attachment units which are provided within a disk surface and on which the small-sized storage medium is to be mounted,
each the attachment unit being located at an equal position from the center of the media cartridge, and
four of the attachment units,
each the attachment unit being located at every angle of 90 degrees relative to the center of the media cartridge.

In another preferred construction, in the media cartridge, a unit to be detected for the position detection of the small-sized storage medium is provided,
on the disk drive side, position detection means for detecting the unit to be detected of the media cartridge is provided,
the unit to be detected being composed of
claws provided on a disk surface of the media cartridge so as to correspond to an attachment position of the small-sized storage medium,
the position detection means being structured by
a micro-switch for sensing a contact by the claw, and
the media cartridge includes:
a plurality of attachment units which are provided within a disk surface and on which the small-sized storage medium is to be mounted,
each the attachment unit being located at an equal position from the center of the media cartridge, and
four of the attachment units,
each the attachment unit being located at every angle of 90 degrees relative to the center of the media cartridge.

In another preferred construction, in the media cartridge, a unit to be detected for the position detection of the small-sized storage medium is provided,
on the disk drive side, position detection means for detecting the unit to be detected of the media cartridge is provided, the media cartridge includes
a plurality of attachment units which are provided within a disk surface and on which the small-sized storage medium is to be mounted,
each the attachment unit being located at an equal position from the center of the media cartridge, and
each the attachment unit including
an identification unit for indicating information which uniquely identifies each the attachment unit, and
the disk drive includes
identification means for identifying each the attachment unit by the identification unit.

In another preferred construction, the media cartridge includes
a plurality of attachment units which are provided within a disk surface and on which the small-sized storage medium is to be mounted,
each the attachment unit being located at an equal position from the center of the media cartridge, and
each the attachment unit including
an identification unit for indicating information which uniquely identifies each the attachment unit, and
the disk drive includes
identification means for identifying each the attachment unit by the identification unit,
each the identification unit being composed of
a combination of a plurality of terminals, and
the identification means individually identifying
each the attachment unit based on the combination of terminals.

In another preferred construction, in the media cartridge, a unit to be detected for the position detection of the small-sized storage medium is provided,
on the disk drive side, position detection means for detecting the unit to be detected of the media cartridge is provided,
the unit to be detected being composed of
claws provided on a disk surface of the media cartridge so as to correspond to an attachment position of the small-sized storage medium,
the position detection means being structured by
a micro-switch for sensing a contact by the claw,
the media cartridge includes
a plurality of attachment units which are provided within a disk surface and on which the small-sized storage medium is to be mounted,
each the attachment unit being located at an equal position from the center of the media cartridge, and
each the attachment unit including
an identification unit for indicating information which uniquely identifies each the attachment unit, and
the disk drive includes
identification means for identifying each the attachment unit by the identification unit,
each the identification unit being composed of
a combination of a plurality of terminals, and
the identification means individually identifying
each the attachment unit based on the combination of terminals.

In another preferred construction, in the media cartridge, a unit to be detected for the position detection of the small-sized storage medium is provided,
on the disk drive side, position detection means for detecting the unit to be detected of the media cartridge is provided,
the unit to be detected being composed of
claws provided on a disk surface of the media cartridge so as to correspond to an attachment position of the small-sized storage medium,
the position detection means being structured by
a micro-switch for sensing a contact by the claw,
the media cartridge includes
a plurality of attachment units which are provided within a disk surface and on which the small-sized storage medium is to be mounted,
each the attachment unit being located at an equal position from the center of the media cartridge, and
each the attachment unit including
an identification unit for indicating information which uniquely identifies each the attachment unit, and
the disk drive includes identification means for identifying each the attachment unit by the identification unit,
each the identification unit being composed of
a predetermined pattern, and
the identification means being composed of
means for optically reading the pattern to individually identify the attachment unit.

In another preferred construction, the media cartridge includes
a plurality of attachment units which are provided within a disk surface and on which the small-sized storage medium is to be mounted,
each the attachment unit being located at an equal position from the center of the media cartridge, and
each the attachment unit including
an identification unit for indicating information which uniquely identifies each the attachment unit, and
the disk drive includes
identification means for identifying each the attachment unit by the identification unit,
the identification unit forming
the information which individually identifies each the attachment unit by a physical configuration provided on a surface or on the outer periphery of the media cartridge, and
the identification means individually identifying
each the attachment unit based on a difference in the physical configuration.

In another preferred construction, in the media cartridge, a unit to be detected for the position detection of the small-sized storage medium is provided,
on the disk drive side, position detection means for detecting the unit to be detected of the media cartridge is provided,
the unit to be detected being composed of
claws provided on a disk surface of the media cartridge so as to correspond to an attachment position of the small-sized storage medium,
the position detection means being structured by
a micro-switch for sensing a contact by the claw,
the media cartridge includes
a plurality of attachment units which are provided within a disk surface and on which the small-sized storage medium is to be mounted,
each the attachment unit being located at an equal position from the center of the media cartridge,
each the attachment unit including
an identification unit for indicating information which uniquely identifies each the attachment unit, and
the disk drive includes
identification means for identifying each the attachment unit by the identification unit, the identification unit forming
the information which individually identifies each the attachment unit by a physical configuration provided on a surface or on the outer periphery of the media cartridge, and
the identification means individually identifying
each the attachment unit based on a difference in the physical configuration.

In another preferred construction, the small-sized storage medium is a smart media.

In another preferred construction, the disk drive is an optical disk drive and the disk is an optical disk.

According to another aspect of the invention, a media cartridge
formed to have the same shape as that of a disk storage medium mounted on a disk drive for accessing the disk storage medium, and
comprising not less than one attachment unit for holding the small-sized storage medium so as to be accessible by access means provided at the disk drive.

In the preferred construction, the media cartridge further comprises
a unit to be detected for the position detection for detecting a position of the small-sized storage medium by position detection means provided on the side of the disk drive,
the unit to be detected being composed of
claws provided on a disk surface of the cartridge so as to correspond to an attachment position of the small-sized storage medium.

In another preferred construction, the media cartridge further comprises
a unit to be detected for the position detection for detecting a position of the small-sized storage medium by position detection means provided on the side of the disk drive,
a plurality of attachment units which are provided within a disk surface and on which the small-sized storage medium is to be mounted,
each the attachment unit being located at an equal position from the center of the cartridge.

In another preferred construction, the media cartridge further comprises
a unit to be detected for the position detection for detecting a position of the small-sized storage medium by position detection means provided on the side of the disk drive,
the unit to be detected being composed of
claws provided on a disk surface of the cartridge so as to correspond to an attachment position of the small-sized storage medium, and
a plurality of attachment units which are provided within a disk surface and on which the small-sized storage medium is to be mounted,
each the attachment unit being located at an equal position from the center of the cartridge.

In another preferred construction, the media cartridge further comprises
a unit to be detected for the position detection for detecting a position of the small-sized storage medium by position detection means provided on the side of the disk drive,
the unit to be detected being composed of
claws provided on a disk surface of the cartridge so as to correspond to an attachment position of the small-sized storage medium,
a plurality of attachment units which are provided within a disk surface and on which the small-sized storage medium is to be mounted,
each the attachment unit being located at an equal position from the center of the cartridge, and
four of the attachment units,
each the attachment unit being located at every angle of 90 degrees relative to the center of the cartridge.

In another preferred construction, the media cartridge further comprises
a unit to be detected for the position detection for detecting a position of the small-sized storage medium by position detection means provided on the side of the disk drive, wherein
each the attachment unit includes an identification unit for indicating information which uniquely identifies each the attachment unit by identification means of the disk drive.

In another preferred construction, the media cartridge further comprises
a unit to be detected for the position detection for detecting a position of the small-sized storage medium by position detection means provided on the side of the disk drive,
the unit to be detected being composed of
claws provided on a disk surface of the cartridge so as to correspond to an attachment position of the small-sized storage medium, wherein
each the attachment unit includes an identification unit for indicating information which uniquely identifies each the attachment unit by identification means of the disk drive.

In another preferred construction, the media cartridge further comprises
a unit to be detected for the position detection for detecting a position of the small-sized storage medium by position detection means provided on the side of the disk drive,
the unit to be detected being composed of
claws provided on a disk surface of the cartridge so as to correspond to an attachment position of the small-sized storage medium, wherein
each the attachment unit includes an identification unit for indicating information which uniquely identifies each the attachment unit by identification means of the disk drive,
each the identification unit being composed of a combination of a plurality of terminals.

In another preferred construction, the media cartridge further comprises
a unit to be detected for the position detection for detecting a position of the small-sized storage medium by position detection means provided on the side of the disk drive, wherein
each the attachment unit includes an identification unit for indicating information which uniquely identifies each the attachment unit by identification means of the disk drive,
each the identification unit being composed of a predetermined pattern optically read by the identification means of the disk drive to identify the attachment unit.

In another preferred construction, the media cartridge further comprises
a unit to be detected for the position detection for detecting a position of the small-sized storage medium by position detection means provided on the side of the disk drive, wherein each the attachment unit includes an identification unit for indicating information which uniquely identifies each the attachment unit by identification means of the disk drive, the identification unit forming the information individually identifying each the attachment unit by a physical configuration provided on a surface or on the outer periphery of the cartridge.

In another preferred construction, the small-sized storage medium is a smart media.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the Drawings.

DESCRIPTION OF THE PREFERRED EMBODIMENTS

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

In the following, a preferred embodiment of the present invention will be described in detail with reference to the drawings.

Figure 1:
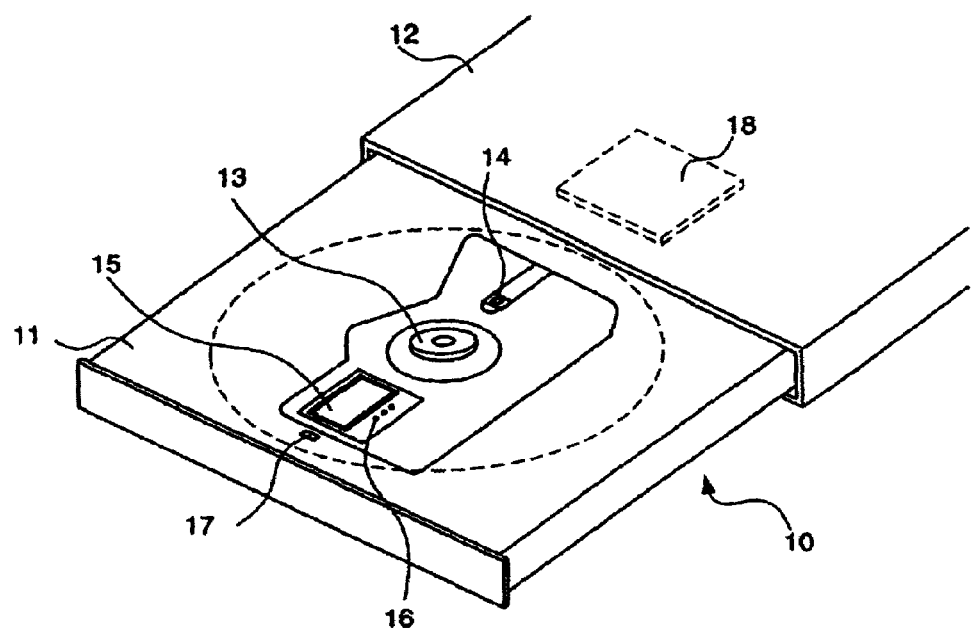
FIG. 1 is a perspective view of a disk drive system according to a preferred embodiment of the present invention.
Figure 2:
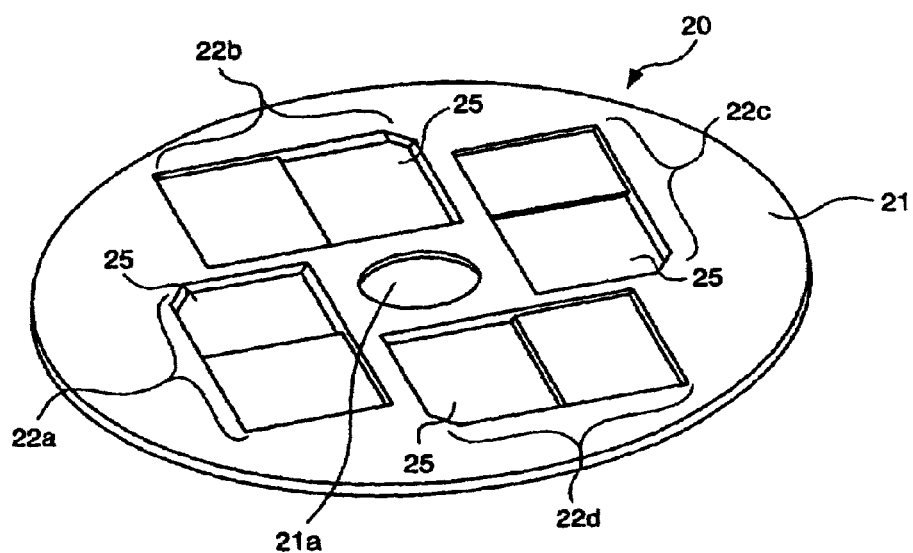
FIG. 2 is a perspective view of a front surface of a media cartridge according to the preferred embodiment of the present invention.
Figure 3:
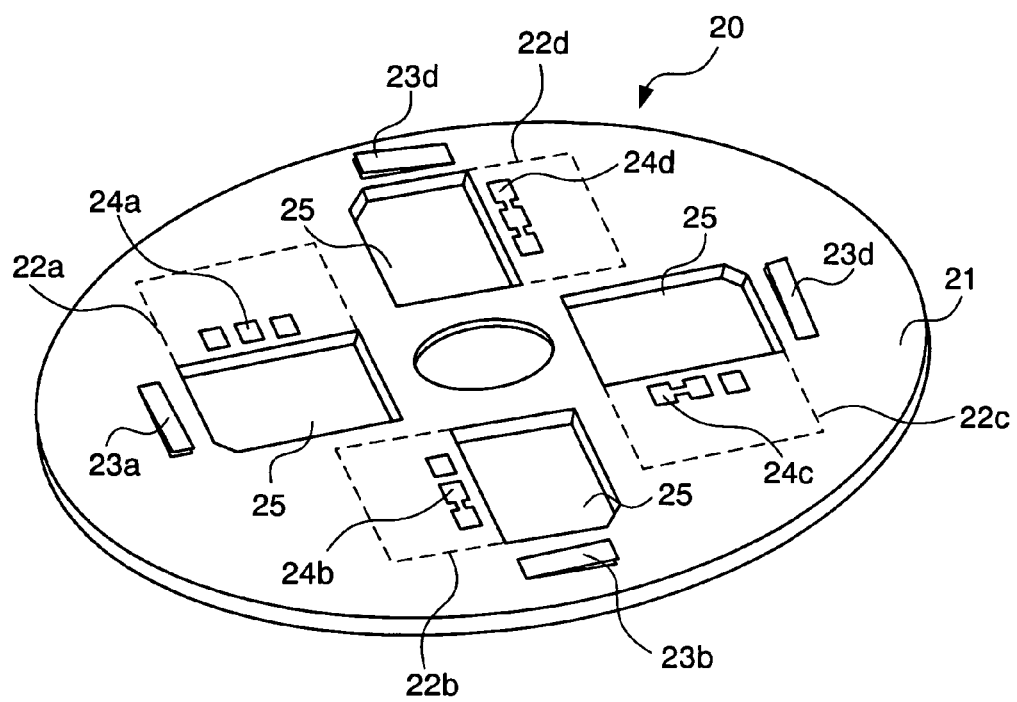
FIG. 3 is a perspective view of a back surface of the media cartridge according to the preferred embodiment of the present invention.

FIGS. 1 to 3 show a structure of a disk drive system according to one embodiment of the present invention. The disk drive system according to the present embodiment is composed of a disk drive 10 capable of conducting reading and writing of both an optical disk such as a CD-ROM and smart media and a media cartridge 20 of the same size as that of an optical disk on which a plurality of smart media can be mounted.

As illustrated in FIG. 1, the disk drive 10 includes, at a tray unit 11 which can be put into and extracted from a main body of a drive 12, a disk rotation shaft 13 of an optical disk such as a CD-ROM, an optical disk access unit 14 for conducting access (write or read) to the optical disk, a smart media access unit 15 for conducting access (write or read) to a smart media 1 mounted on the media cartridge 20, a media recognition sensor 16 for recognizing the smart media 1 mounted on the media cartridge 20 and a media positioning unit 17 for positioning the smart media 20, and a disk keep unit 18.

The media cartridge 20, as illustrated in FIGS. 2 and 3, is structured with a cartridge main body 21 of the same size as that of the optical disk which has a shaft hole 21a fit in the disk rotation shaft 13 provided at the center, on which smart media attachment units 22a to 22d, media positioning claws 23a to 23d and media recognition terminals 24a to 24d are provided.

Figure 4:
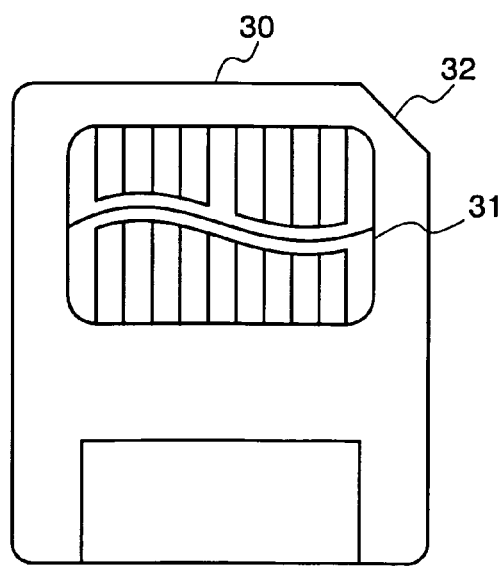
FIG. 4 is a view showing an appearance of a smart media.
Figure 5:
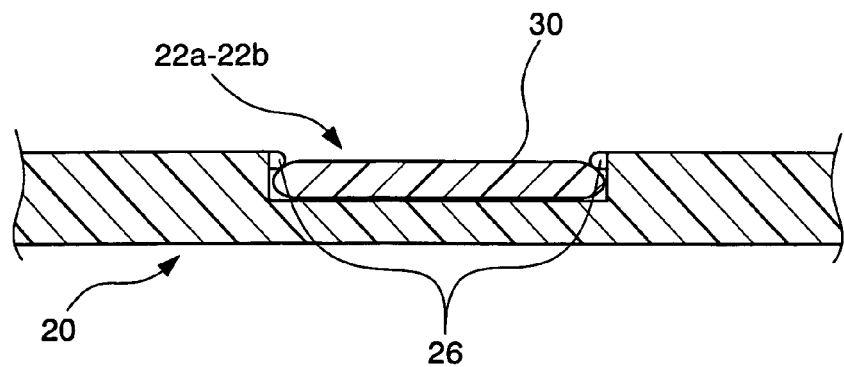
FIG. 5 is sectional view showing a state where a smart media is attached to the media cartridge according to the preferred embodiment of the present invention.

The smart media attachment units 22a to 22d are formed of concavities on the surface of the media cartridge 20 in which the smart media 1 shown in FIG. 4 is fit in and mounted and whose configuration is adapted to an outer configuration of the smart media 1.

The smart media attachment units 22a to 22d are formed at four positions on the media cartridge 20.

Here, the smart media 1 to be attached is formed to have an approximately square outline and provided with a cutout 32 at a part, on the surface of which a contact area 31 is arranged for conducting data access as illustrated in FIG. 4. Structure of this smart media 1 is that commonly used.

Provided at a plurality of the parts of the upper edges of the smart media attachment units 22a to 22d are projections 26 for fixing the attached smart media 1 not to be detached. At the time of mounting the smart media 1 on the smart media attachment units 22a to 22d, the smart media 1 is pressed so as to climb over the projections 26.

Formed at each of the smart media attachment units 22a to 22d is an opening 25 for making the contact area 31 of the attached smart media 1 be exposed to the back side.

Data read and write of the smart media 1 attached to the smart media attachment units 22a to 22d is executed as a result of contact of the smart media access unit 15 to the contact area 31 through the opening 25.

Provided on the back side of the media cartridge 20 are the media positioning claws 23a to 23d in the proximity and corresponding to the smart media attachment units 22a to 22d as shown in FIG. 3. Provided on the back side of the smart media attachment units 22a to 22d are the drive recognition terminals 24a to 24d, respectively.

Detection of any of the media positioning claws 23a to 23d by the media positioning unit 17 provided on the tray unit 11 of the disk drive 10 results in positioning the mounted smart media 1 relative to the smart media access unit 15.

Figure 6:
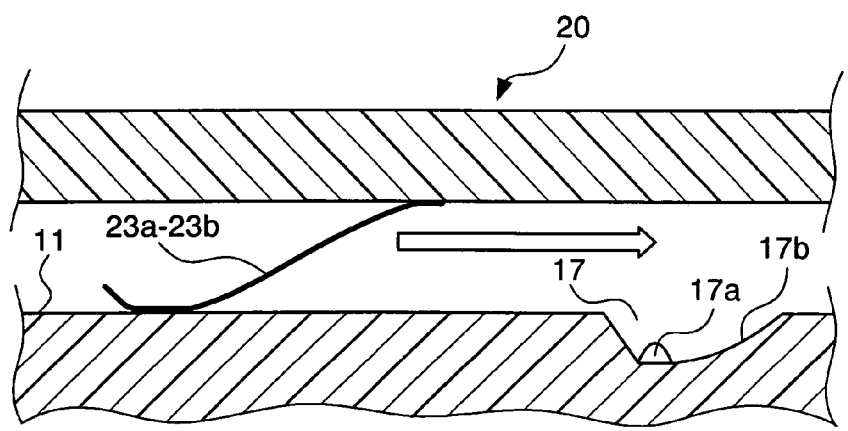
FIG. 6 is a view for use in explaining media cartridge positioning operation according to the preferred embodiment of the present invention.

The media positioning claw 23a to 23d, as illustrated in FIG. 6, are fixed projecting from the back side of the media cartridge 20. The media positioning unit 17 of the tray unit 11 is structured to have a micro-switch 17a for sensing a contact by the media positioning claws 23a to 23d arranged in a concavity 17b in which the media positioning claws 23a to 23d are fit in.

Sensing of any of the drive recognition terminals 24a to 24d by the media recognition sensor 16 of the tray unit 11 leads to recognition of the positioned smart media 1.

Figure 11:
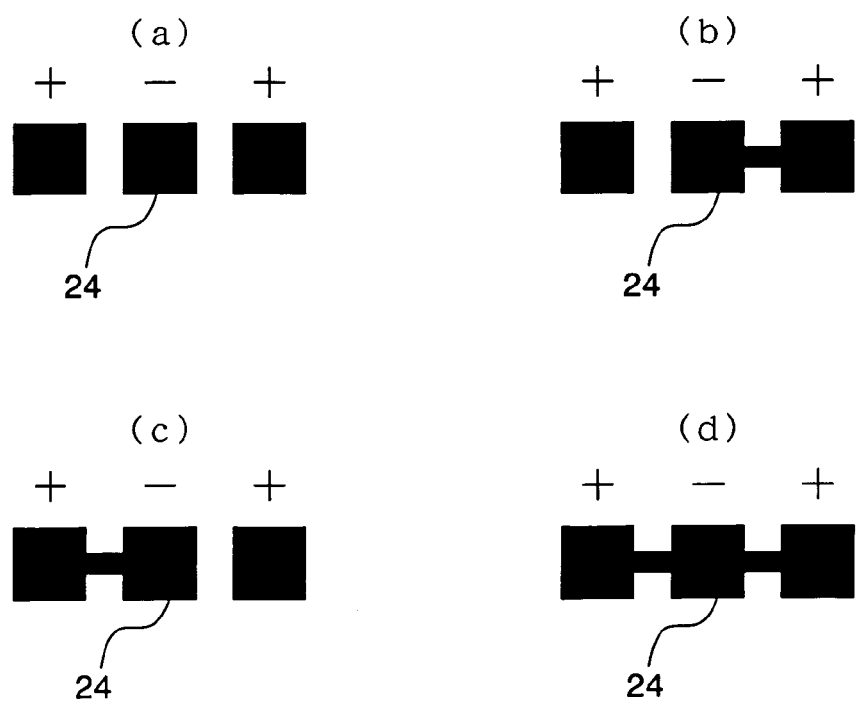
FIG. 11 is a view showing a configuration of a terminal for drive recognition in the media cartridge according to the preferred embodiment of the present invention.

The drive recognition terminals 24a to 24d are each formed of a combination of terminals, one minus terminal and two plus terminals as illustrated in FIG. 11 and based on a combination of current flows at the time of electrical contact of the drive recognition sensor 16, determination is made which of the smart media 1 of the smart media attachment units 22a to 22d is positioned at the smart media access unit 15 and selected.

Figure 10:
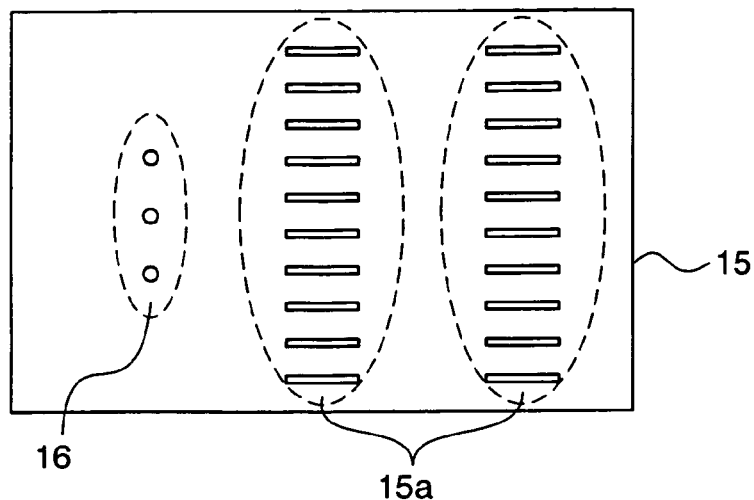
FIG. 10 is a plan view of the smart media access unit according to the preferred embodiment of the present invention.

The smart media access unit 15 is provided to be up and down movable on the tray unit 11. In addition, as shown in FIG. 10, arranged on the upper surface of the access unit 15 is a smart media access terminal 15a for conducting data writing and reading in contact with the contact area 31 of the smart media 1 and arranged in the vicinity of the same is the media recognition sensor 16.

The disk keep unit 18 of the disk drive 10 is provided in the drive main body 12 so as to be up and down movable and to press the positioned smart media 1 toward the smart media access unit 15 by a predetermined force.

Next, description will be made of operation of thus structured disk drive system according to the present embodiment.

When an optical disk or the media cartridge 20 is set to the tray unit 11 to close the tray unit 11, the optical disk access unit 14 confirms whether the optical disk is inserted or not.

Then, an optical disk mode is set when the optical disk is sensed and a smart media mode is set when the same is not sensed.

In the optical disk mode, data write and read to and from the inserted ordinary optical disk is conducted by the optical disk access unit 14.

In the smart media mode, that is, when the media cartridge 20 is inserted, the system operates in the following manner.

First, a rotation speed is set to be a rotation speed for the smart media cartridge 20 (lower than a speed for an optical disk).

Figure 7:
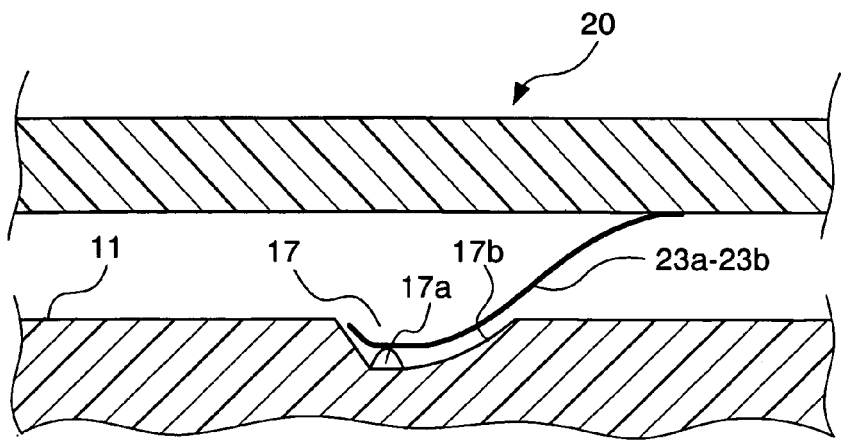
FIG. 7 is a view for use in explaining media cartridge positioning operation according to the preferred embodiment of the present invention.

At this time, while the micro-switch 17a in the media positioning unit 17 is at the off state as illustrated in FIG. 6, when the media cartridge 20 rotates to make the media positioning claws 23a to 23d fit in the media positioning unit 17 and come into contact with the micro-switch 17a, the micro-switch 17a is turned on as illustrated in FIG. 7.

Figure 8:
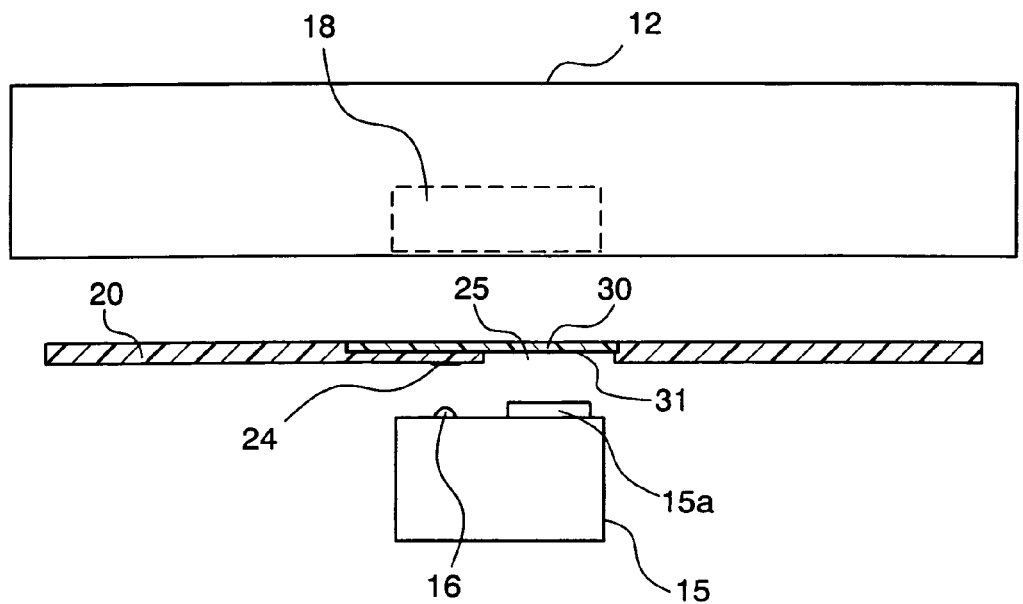
FIG. 8 is a view showing a state where the smart media is positioned at a smart media access unit according to the preferred embodiment of the present invention.

Turn-on of the micro-switch 17a stops the rotation of the media cartridge 20. The foregoing operation enables the smart media 1 mounted on the media cartridge 20 to be positioned at the smart media access unit 15 as illustrated in FIG. 8.

Figure 9:
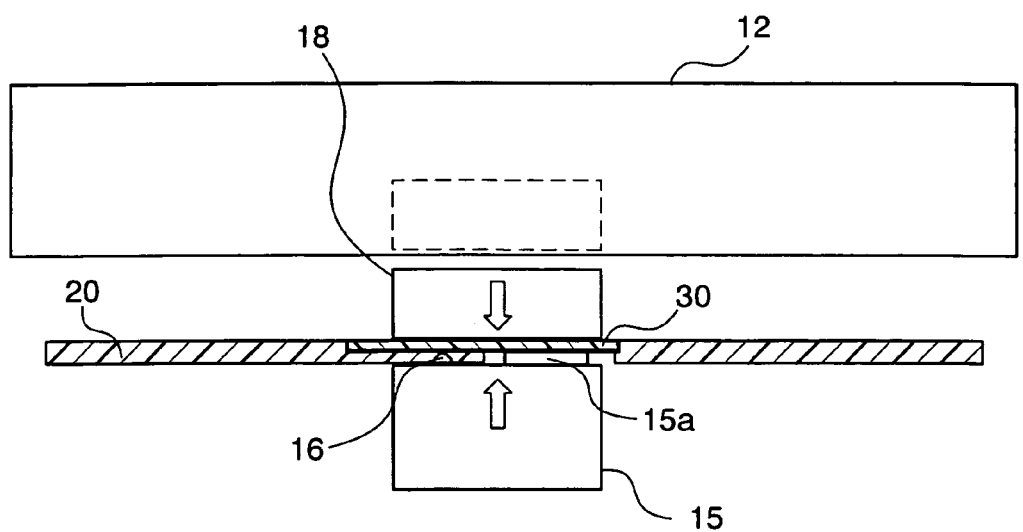
FIG. 9 is a view showing a state where the smart media is sandwiched together with the cartridge according to the preferred embodiment of the present invention.

After the positioning, the smart media access unit 15 and the disk keep unit 18 move from the opposite sides to fix the smart media 1 being sandwiched together with the media cartridge 20 as illustrated in FIG. 9.

At this time, the smart media access terminal 15a and the drive recognition sensor 16 shown in FIG. 10 come into electrical contact with the contact area 31 of the smart media 1 and the drive recognition terminals 24a to 24d of the media cartridge 20.

Coming into contact of the drive recognition sensor 16 with the drive recognition terminals 24a to 24d leads to determination which of the smart media 1 of the smart media attachment units 22a to 22d is positioned and selected according to a combination of electric currents at the time of contact.

Then, data write and read to and from the smart media 1 is conducted by the smart media access terminal 15a of the smart media access unit 15.

In addition, in a case of accessing other smart media 1, rotate the media cartridge 20 to position other smart media 1 mounted on other smart media attachment units 22a to 22d and to make access in the same manner.

The foregoing mechanism realizes a smart media changer capable of simultaneously accessing four smart media 1.

Figure 12:
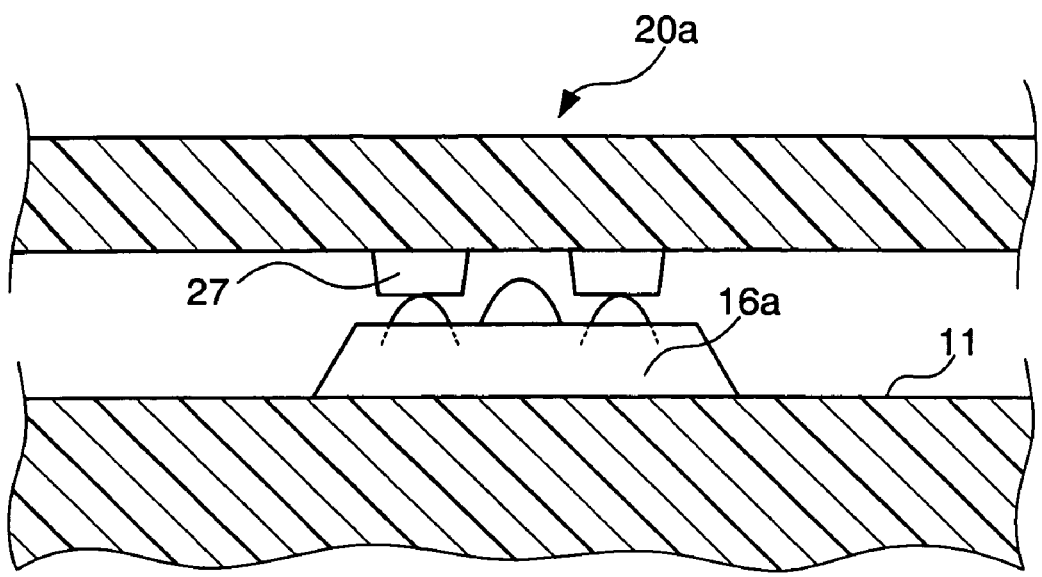
FIG. 12 is a view showing another structure for mechanically recognizing the smart media attached to the media cartridge.

Although in the above-described embodiment, determination which of the smart media 1 of the smart media attachment units 22a to 22d is positioned is made by electrical contact of the drive recognition sensor 16 with the drive recognition terminals 24a to 24d, other arrangement is possible as shown in FIG. 12 in which a drive recognition projection unit 27 made up of a plurality of projections is provided on the side of the media cartridge 20 in place of the drive recognition terminals and a contact sensor 16a for identifying a combination of the drive recognition projection unit 27 by mechanical contact is provided on the side of the disk drive 10.

Figure 13:
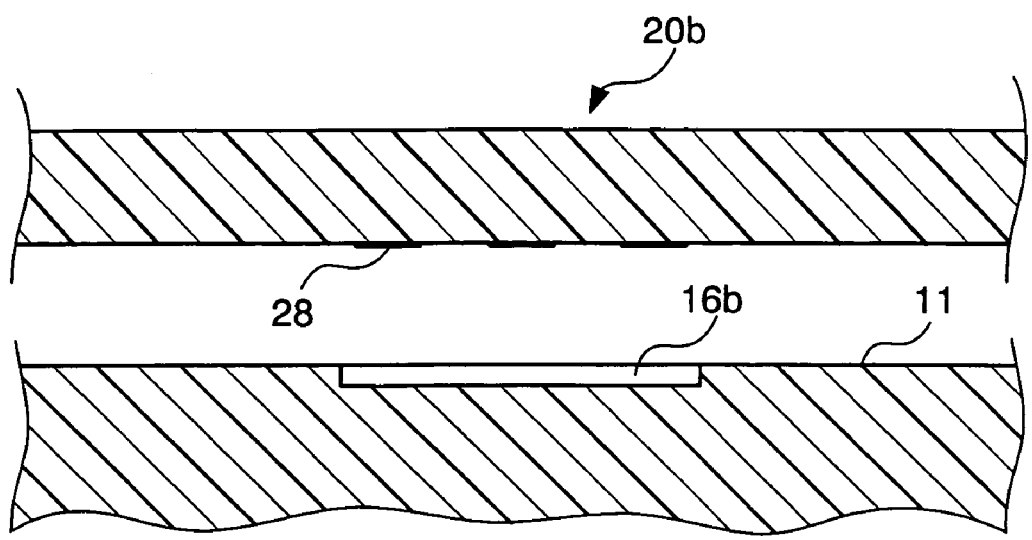
FIG. 13 is a view showing a further structure for optically recognizing the smart media attached to the media cartridge.
Figure 14:
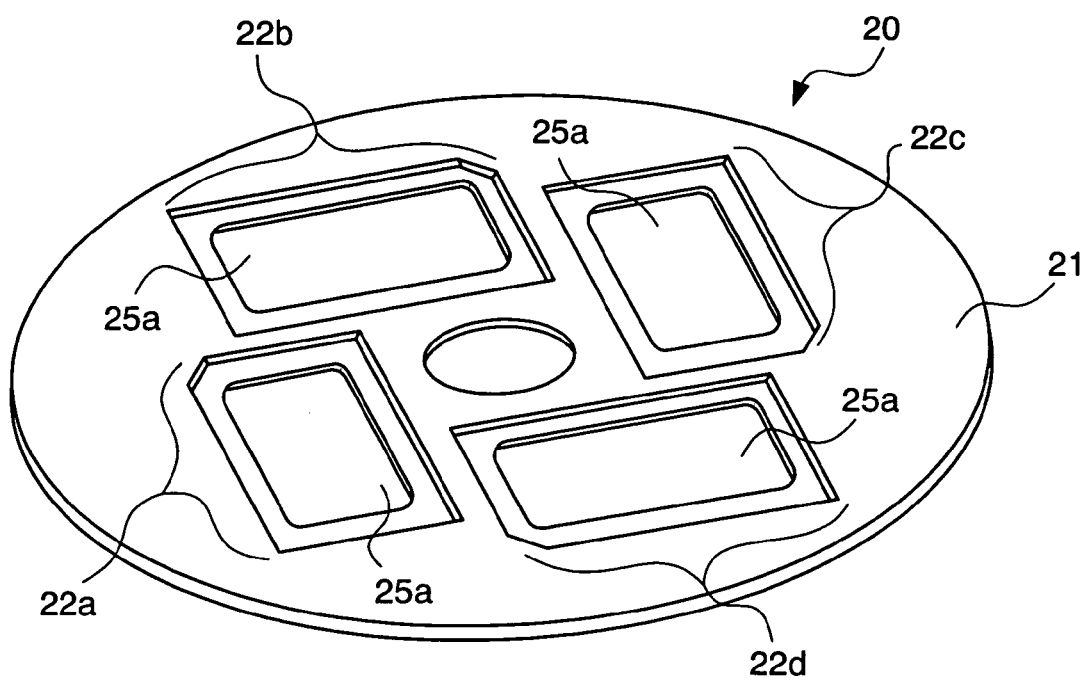
FIG. 14 is a view showing another example of a structure of a smart media.

Further possible is an arrangement as illustrated in FIG. 13 in which a drive recognition pattern 28 such as a bar code is provided on the side of the media cartridge 20 in place of the drive recognition terminal and an optical sensor 16b for optically reading and identifying the drive recognition pattern 28 is provided on the side of the disk drive 10. Other than a pattern such as a bar code, characters and the like can be optically read and recognized.

Moreover, replacing the openings of the smart media attachment units 22a to 22d of the media cartridge 20 by openings 25a through which not the part of the contact area 31 but the whole of the smart media 1 is exposed enables detachment of the smart media 1 from the smart media attachment units 22a to 22d without direct contact of a finger with the contact area 31.

In addition, although in the above-described embodiment, the smart media access unit 15 is provided on the tray unit 11 of the disk drive 10, it can be provided not on the tray unit 11 but on the side of the drive main body 12.

The system is applicable not only to a disk drive of a tray type but also to that of a clamshell type.

Applicable as the disk drive 10 are such drives as a CD-ROM drive, a CD-R drive, a CD-R/RW drive, a DVD-ROM drive, a DVD-RAM drive, and a PD drive.

Furthermore, although in the above-described embodiment, the number of smart media which can be set in the media cartridge 20 is four, it can be not more than four or not less than four if physically allowed.

As described in the foregoing, according to the disk drive system of the present invention, incorporation of a smart media reading and writing function into a disk drive allows a space for the disk drive to make access to both an optical disk media and the smart media, thereby enabling reduction of a device installation space in an information apparatus such as a personal computer.

In addition, since the function of the smart media changer is realized by the arrangement in which a plurality of smart media are mounted on a smart media cartridge, the plurality of smart media can be handled simultaneously to enable efficient use.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A media cartridge
formed to have the same shape as that of a disk storage medium mounted on a disk drive for accessing said disk storage medium, and
comprising not less than one attachment unit for holding a small-sized storage medium so as to be accessible by access means provided at said disk drive, and
further comprising a unit to be detected for the position detection for detecting a position of said small-sized storage medium by position detection means provided on the side of said disk drive.

2. The media cartridge as set forth in claim 1,
said unit to be detected being composed of
claws provided on a disk surface of said cartridge so as to correspond to an attachment position of said small-sized storage medium.

3. The media cartridge as set forth in claim 1, further comprising:
a plurality of attachment units which are provided within a disk surface and on which said small-sized storage medium is to be mounted,
each said attachment unit being located at an equal position from the center of said cartridge.

4. The media cartridge as set forth in claim 2, further comprising:
a plurality of attachment units which are provided within a disk surface and on which said small-sized storage medium is to be mounted,
each said attachment unit being located at an equal position from the center of said cartridge.

5. A media cartridge formed to have the same shape as that of a disk storage medium mounted on a disk drive for accessing said disk storage medium, and
comprising not less than one attachment unit for holding a small-sized storage medium so as to be accessible by access means provided at said disk drive,
and further comprising:
a plurality of attachment units which are provided within a disk surface and on which said small-sized storage medium is to be mounted,
each said attachment unit being located at an equal position from the center of said cartridge, and
said plurality of attachment units being four in number,
each said attachment unit being located at every angle of 90 degrees relative to the center of said cartridge.

6. The media cartridge as set forth in claim 5, further comprising:
a unit to be detected for the position detection for detecting a position of said small-sized storage medium by position detection means provided on the side of said disk drive.

7. The media cartridge as set forth in claim 4,
said plurality of attachment units being four in number,
each said attachment unit being located at every angle of 90 degrees relative to the center of said cartridge.

8. A media cartridge formed to have the same shape as that of a disk storage medium mounted on a disk drive for accessing said disk storage medium, and
comprising not less than one attachment unit for holding a small-sized storage medium so as to be accessible by access means provided at said disk drive,
wherein
each said attachment unit includes an identification unit for indicating information which uniquely identifies each said attachment unit by identification means of said disk drive.

9. The media cartridge as set forth in claim 8, further comprising:
a unit to be detected for the position detection for detecting a position of said small-sized storage medium by position detection means provided on the side of said disk drive.

10. The media cartridge as set forth in claim 8, further comprising:
a unit to be detected for the position detection for detecting a position of said small-sized storage medium by position detection means provided on the side of said disk drive,
said unit to be detected being composed of
claws provided on a disk surface of said cartridge so as to correspond to an attachment position of said small-sized storage medium.

11. The media cartridge as set forth in claim 8, wherein
each said identification unit being composed of a combination of a plurality of terminals.

12. The media cartridge as set forth in claim 8, further comprising:
a unit to be detected for the position detection for detecting a position of said small-sized storage medium by position detection means provided on the side of said disk drive, wherein
each said identification unit being composed of a combination of a plurality of terminals.

13. The media cartridge as set forth in claim 8,
said unit to be detected being composed of
claws provided on a disk surface of said cartridge so as to correspond to an attachment position of said small-sized storage medium, wherein
each said attachment unit includes an identification unit for indicating information which uniquely identifies each said attachment unit by identification means of said disk drive,
each said identification unit being composed of a combination of a plurality of terminals.

14. The media cartridge as set forth in claim 8, wherein
each said identification unit being composed of a predetermined pattern optically read by the identification means of said disk drive to identify said attachment unit.

15. The media cartridge as set forth in claim 8, further comprising:
a unit to be detected for the position detection for detecting a position of said small-sized storage medium by position detection means provided on the side of said disk drive, wherein each said identification unit being composed of a predetermined pattern optically read by the identification means of said disk drive to identify said attachment unit.

16. The media cartridge as set forth in claim 8, further comprising:
a unit to be detected for the position detection for detecting a position of said small-sized storage medium by position detection means provided on the side of said disk drive,
said unit to be detected being composed of
claws provided on a disk surface of said cartridge so as to correspond to an attachment position of said small-sized storage medium, wherein
each said identification unit being composed of a predetermined pattern optically read by the identification means of said disk drive to identify said attachment unit.

17. The media cartridge as set forth in claim 8, wherein said identification unit forming
the information individually identifying each said attachment unit by a physical configuration provided on a surface or on the outer periphery of said cartridge.

18. The media cartridge as set forth in claim 8, further comprising:
a unit to be detected for the position detection for detecting a position of said small-sized storage medium by position detection means provided on the side of said disk drive, wherein
said identification unit forming
the information individually identifying each said attachment unit by a physical configuration provided on a surface or on the outer periphery of said cartridge.

19. The media cartridge as set forth in claim 8, further comprising:
a unit to be detected for the position detection for detecting a position of said small-sized storage medium by position detection means provided on the side of said disk drive,
said unit to be detected being composed of
claws provided on a disk surface of said cartridge so as to correspond to an attachment position of said small-sized storage medium, wherein
each said identification unit forming
the information individually identifying each said attachment unit by a physical configuration provided on a surface or on the outer periphery of said cartridge.

20. A media cartridge formed to have the same shape as that of a disk storage medium mounted on a disk drive for accessing said disk storage medium, and
comprising not less than one attachment unit for holding a small-sized storage medium so as to be accessible by access means provided at said disk drive,
wherein said small-sized storage medium is a smart media.

* * * * *